June 16, 1942. J. H. MILLER ET AL 2,286,753
HOSIERY
Filed March 5, 1937 5 Sheets-Sheet 1
Fig.1.
Fig.2.
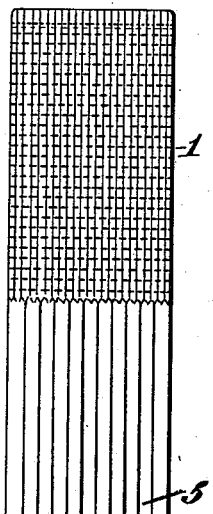
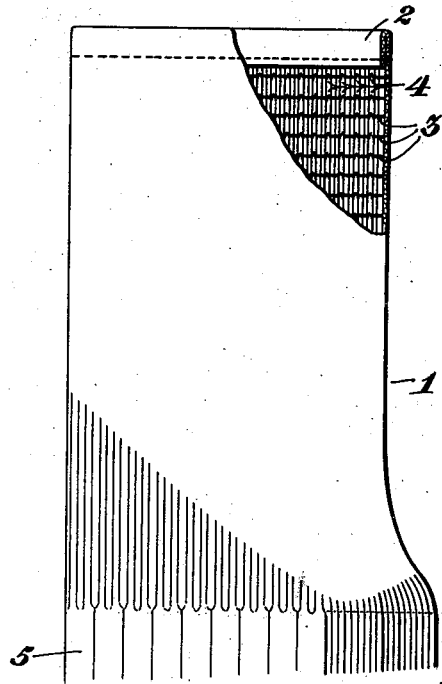
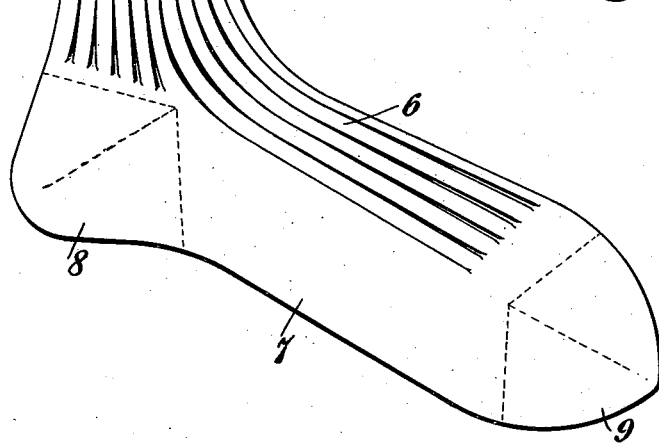
INVENTORS
John H. Miller
Frank Evans
BY Lewis Prevost Whitaker
ATTORNEY

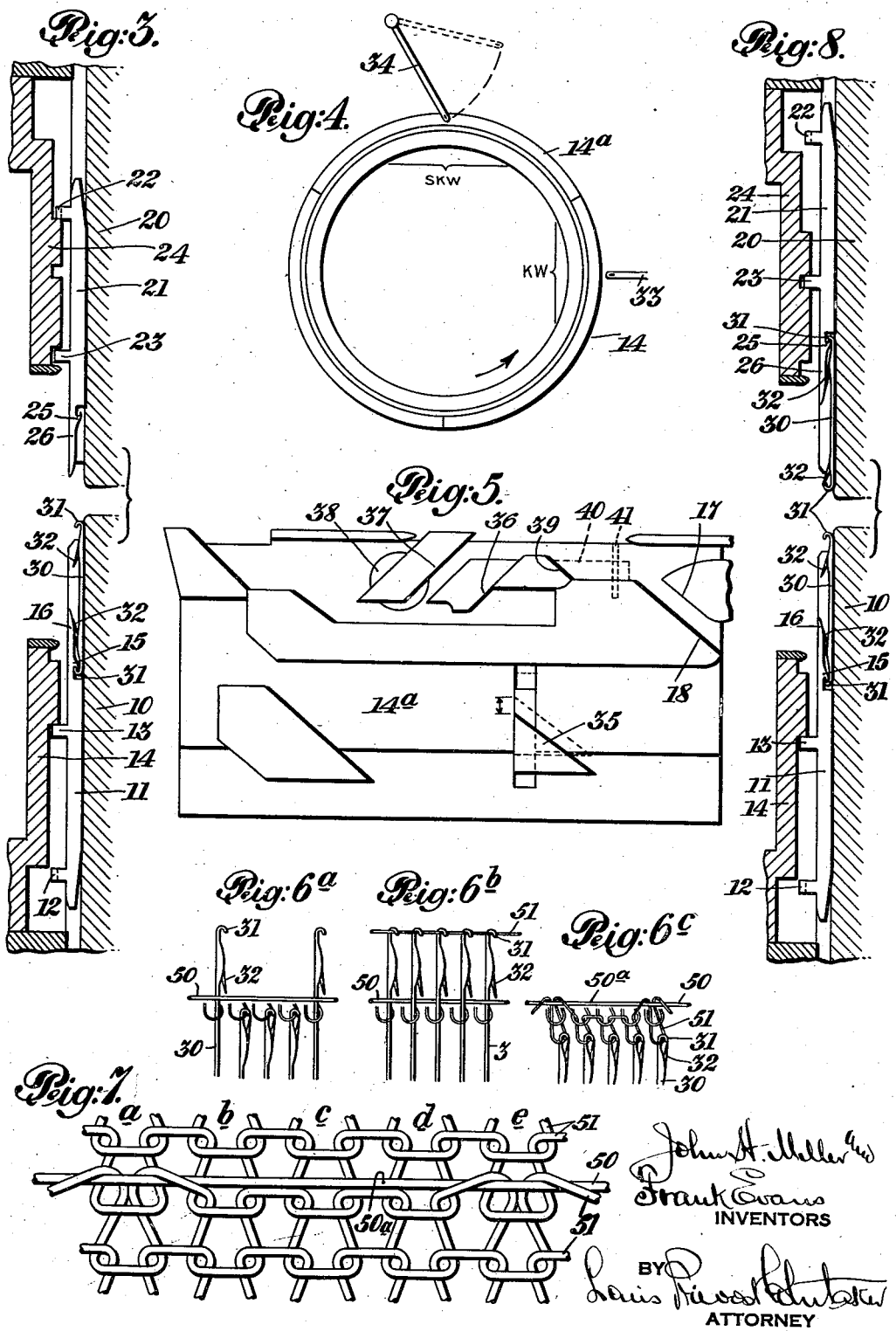

June 16, 1942.  J. H. MILLER ET AL  2,286,753
HOSIERY
Filed March 5, 1937   5 Sheets-Sheet 3
Fig. 10.
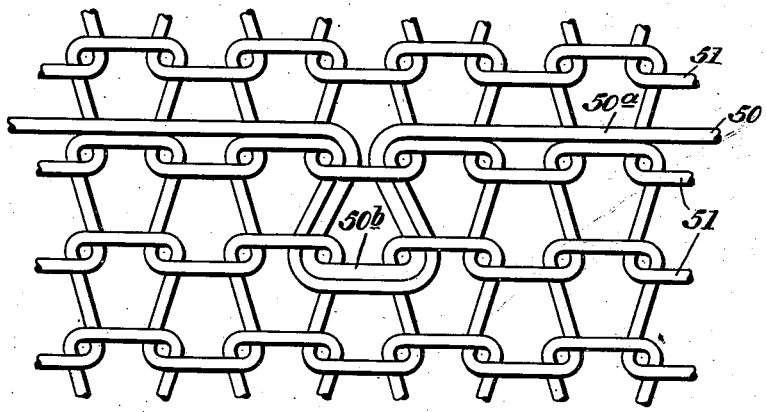
Fig. 11
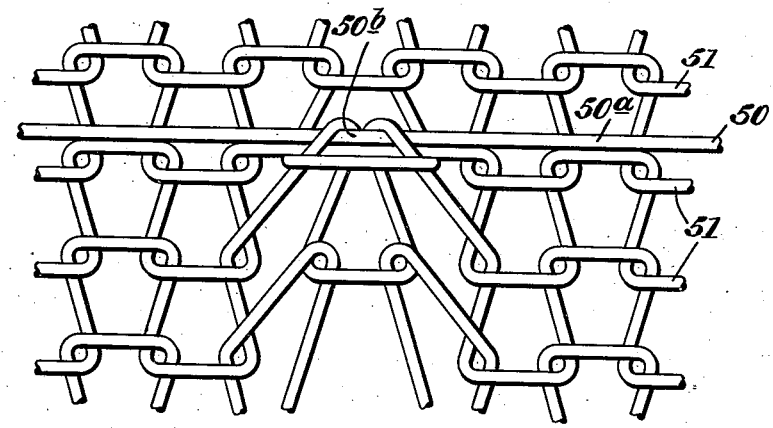
Fig. 9ª 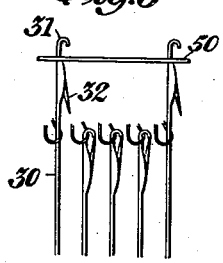   Fig. 9ᵇ 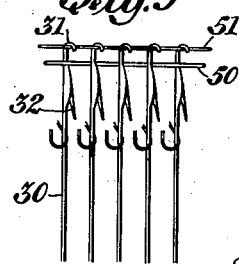   Fig. 9ᶜ 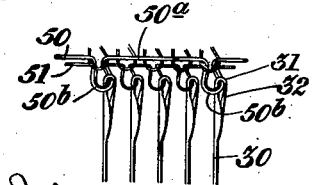
INVENTORS
BY
ATTORNEY

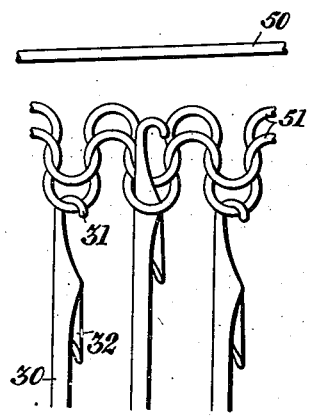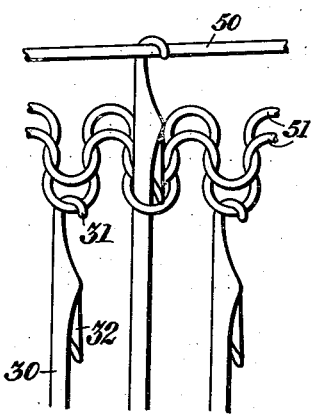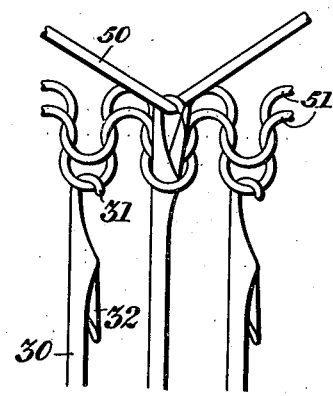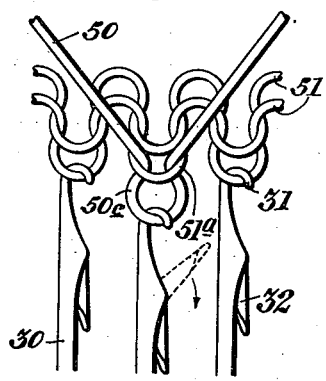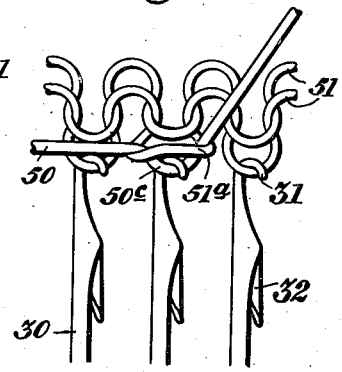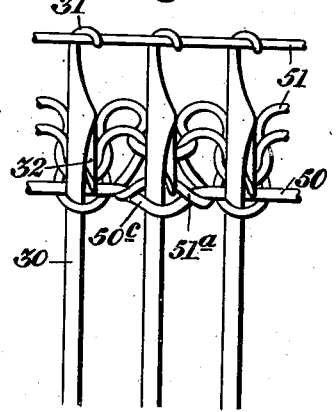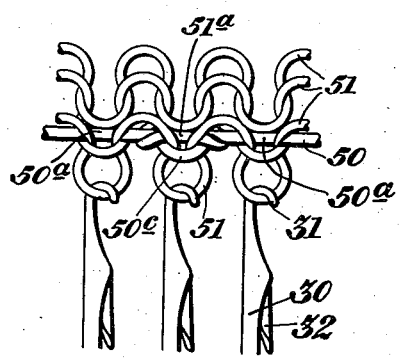

June 16, 1942.  J. H. MILLER ET AL  2,286,753
HOSIERY
Filed March 5, 1937  5 Sheets-Sheet 5
Fig: 19.
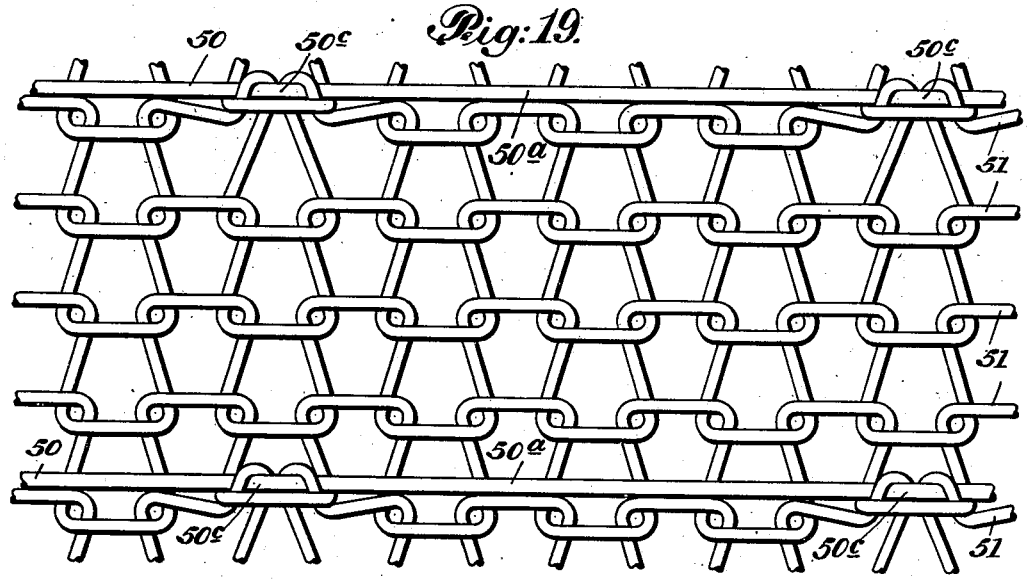
Fig: 20.
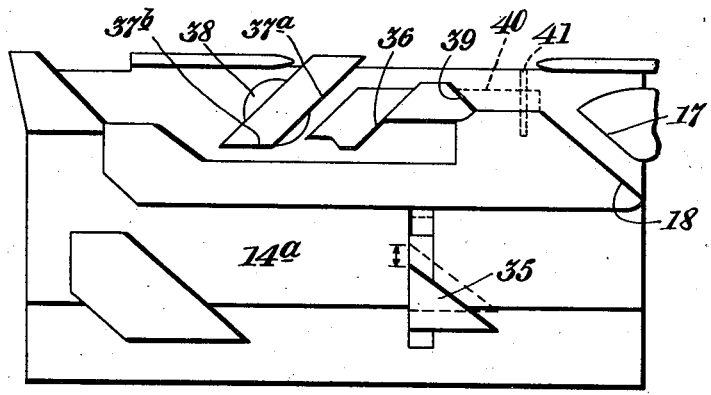
INVENTORS
BY
ATTORNEY Patented June 16, 1942

2,286,753

UNITED STATES PATENT OFFICE 2,286,753

HOSIERY

John H. Miller and Frank Evans, Martinsburg W. Va., assignors to Interwoven Stocking Company, New Brunswick, N. J., a corporation of New Jersey Application March 5, 1937, Serial No. 129,206

15 Claims. (Cl. 66—172)

Our invention consists in the novel features hereinafter described, reference being had to the accompanying drawings, which illustrate several embodiments of the same and the manner in which our invention is carried into effect selected by us for purposes of illustration, and the said invention is fully disclosed in the following description and claims.

Our invention consists in a novel article of hosiery or the like, having a tubular body portion formed of ribbed knit material, and a terminal tubular portion formed of plain knitting preferably knit continuously with the rib knit portion and having incorporated in said plain knit portion, elastic thread, such as rubber or Lastex, under tension, embodied in the fabric and locked therein at separated wales in each of a plurality of separated courses, and providing on the interior of the fabric floats of the elastic thread forming substantially continuous transversely disposed ridges adapted to engage, and slightly, indent the body member encircled thereby, so as to hold it in place longitudinally thereof, and at the same time fit it to the enclosed member. The process of forming the said article of hosiery is not claimed herein as it forms the subject matter of a divisional application of this application, filed by us August 6, 1937. A specific embodiment of our invention may consist, for example, of a sock or stocking having the leg portion and top of the foot formed of rib knitting, for example 6 x 3 rib, and having a form fitting and self-supporting top corresponding with the ordinary top of a sock or stocking, formed of plain knitting in the manner above described and preferably integral therewith, the wales of the plain knit top or portion in which the elastic thread is secured being arranged vertically in line with each other, and the tension of the elastic throughout being sufficient to draw the tubular plain knit portion into vertically disposed ridges, simulating rib work, for example, of the 1 x 1 rib type, so that the plain knit top or portion will support the leg of the stocking by virtue of the independent engagement of the separated horizontal rows of floats of the elastic thread on its inner surface in frictional contact with the leg of the wearer, and obviate the necessity for the use of garters, while at the same time presenting the normal appearance of a rib knit sock of the kind described, and having the same form fitting characteristics.

It has recently been proposed to provide a plain knit seamless stocking, anklet or sock, with a plain knit top having an elastic thread incorporated therein in the manner above described, in place of the usual rib knit top and knit continuously with the plain knit leg and foot, on the same machine, that is to say a circular knitting machine having a single circular course of needles, and this subject matter we do not claim.

Rib knitting is ordinarily formed on an entirely different type of machine from that producing plain knitting, to wit, a rib knitting machine, which is usually provided with two circular series of needles, as a horizontal series known as dial needles, and a vertical circular series known as cylinder needles, a portion of the needles for forming a complete course of rib work being comprised in each of said series. For example, in making a 1 x 1 rib, the needles of the dial will alternate with the needles of the cylinder, in which case alternate ribs will project at the outer surface of the fabric, while the intervening ribs project at the inner surface of the fabric. In a 6 x 3 rib, for example, three consecutive needles in the dial will alternate with six vertical needles in the cylinder, and other combinations can be made up by suitably varying the relations of the needles in the dial and cylinder.

In introducing an elastic thread into rib work, it is customary to lay it in during the knitting of the fabric between the infacing and outfacing ribs. It is therefore separated or held away from the leg of the wearer by the infacing ribs, so that it is not possible to present substantially continuous floats of the rubber or Lastex thread on the inner face of a rib fabric to come into contact with the leg, and by slightly indenting it, to make it support the entire leg of the stocking without the use of a garter, as is easily possible in the case of plain knitting.

Our invention in its preferred form therefore consists, assuming that knitting is commenced at the top of the stocking, in first forming a predetermined length of plain knit fabric constituting the top and introducing therein during the knitting thereof, an elastic thread of rubber or Lastex, which is locked into the fabric at corresponding separated wales and in separated courses throughout all or a considerable length of the plain knit portion, and floated on the inner face of the plain knit fabric between said locked portions, the elastic thread being fed under tension, so as to draw the fabric into parallel vertical ridges, simulating rib work and being form fitting, like rib work, and at the same time providing circular series of horizontally disposed ridges formed by said floated portions of the elastic thread to directly engage the leg of the wearer and support the entire leg of the stocking without a garter, and then knitting continuously from the last course of plain knitting, either with the same knitting thread or different thread, as may be preferred, courses of rib knitting, for example, 6 x 3 rib knitting, and finishing the foot of the stocking in the manner customary in connection with rib knit hose. The result is, in the specific form mentioned, a normal appearing rib knit hose having the leg and top of the foot of any desired rib pattern, as 6 x 3 rib for example, combined with an elastic plain knit form fitting and self-supporting top, by means of which the stocking can be supported on the leg without the use of garters. It will be understood that in the preferred form of our invention the first row of rib knit stitches will be knit directly into the terminal row of plain knit stitches of plain knit top, so that the top and leg of the stocking may be properly termed an integral fabric, whether the identical knitting thread is employed or not.

In carrying our invention into effect, we prefer to employ a knitting machine having upper and lower needle cylinders in axial alignment and having their needle grooves in vertical alignment instead of the usual dial and cylinder, and equipped with needles having hooks at both ends and capable of being shifted from one cylinder to the other, and operating in either, so that all the needles may be assembled in one cylinder and operated for the purpose of knitting the plain knit top portion with the body thread fed continuously to all the needles and the elastic thread fed to separated needles in each course, and in separated courses, after which certain of the needles may be shifted to the other cylinder, according to the rib pattern which is to be formed, as 6 x 3, 2 x 5, 1 x 1, or any other specific rib design, the shifted needles remaining in the loops of the last course of plain knitting. Thereupon the rib knit leg portion is knit, so that the first course of rib knitting is integral with the last course of plain knitting, and completed to the heel, the heel, foot and toe portions being knit in the usual and well known manner in finishing rib knit hosiery.

Referring to the accompanying drawings,

Fig. 1 represents a stocking embodying our invention having a 6 x 3 rib leg and plain knit top with an elastic thread incorporated in spaced wales of spaced courses thereof.

Fig. 2 is an enlarged view, partly broken away, of the upper portion of the sock shown in Fig. 1, partly expanded.

Fig. 3 is a partial sectional view of a machine capable of carrying out our novel process and producing our novel product.

Fig. 4 is a diagrammatic plan view of the lower cylinder of the machine illustrated in Fig. 3, showing the location of the auxiliary feed for the elastic thread and auxiliary cam block adjacent thereto.

Fig. 5 is a detail layout of the auxiliary cams.

Fig. 6a is a diagrammatic detail view of a series of consecutive needles in the lower cylinder, arranged to produce plain knitting and illustrating one manner of feeding the elastic thread below the latches of selected needles.

Fig. 6b is a similar view showing the same needles receiving the body thread in the hooks of all of the needles.

Fig. 6c is a similar view showing the needles drawing their stitches and the selected needles locking the elastic thread at spaced wales into the fabric.

Fig. 7 is a diagrammatic view of a portion of the fabric in extended condition.

Fig. 8 is a view similar to Fig. 3 showing a portion of the needles transferred to the upper cylinder to knit the ribbed leg of the stocking.

Fig. 9a is a view similar to Fig. 6a showing the elastic thread fed to the selected needles above the latches.

Fig. 9b is a view similar to Fig. 6b showing the body thread fed to all of the needles.

Fig. 9c is a view similar to Fig. 6c showing the loops drawn by the needles, the selected needles drawing loops of both the elastic thread and body thread.

Fig. 10 is a diagrammatic view of the fabric knit in the manner illustrated in Figs. 9a, 9b and 9c, and illustrating the loops or stitches as formed, the fabric being in extended condition.

Fig. 11 is a similar view showing the manner in which the elastic thread under tension straightens out, and distorts somewhat the adjacent stitches formed of the body thread only.

Fig. 12 is a diagrammatic view showing the raising of a selected needle to receive the elastic thread in the hook, for incorporating it in the fabric in another and different manner.

Fig. 13 is a similar view showing the elastic thread in the hook of a selected needle.

Fig. 14 is a similar view showing a selected needle drawing a loop of the elastic thread by means of the auxiliary stitch cam.

Fig. 15 is a similar view showing the loop of elastic thread drawn by a selected needle and the corresponding loop of body thread cast off.

Fig. 16 is a similar view showing a selected needle holding the loop of elastic thread while the other needles hold loops of body thread.

Fig. 17 is a similar view showing all the needles rising through their respective loops to receive the body thread.

Fig. 18 is a similar view showing the needles drawing loops of body thread, a selected needle drawing its loop through and casting off the previously formed loop of elastic thread.

Fig. 19 is a diagrammatic view of the fabric formed as illustrated in Figs. 12 to 18 inclusive, in extended condition and with the elastic thread loops straightened out.

Fig. 20 is a diagrammatic layout of the auxiliary cam block for forming the fabric shown in Fig. 19.

Referring to the drawings, we have shown in Figs. 1 and 2, the preferred form of our product which is a sock having a top 1, formed of plain circular or seamless knitting and provided at its upper end with any suitable type of selvage 2, and having an elastic thread 3 of rubber Lastex or the like locked into the fabric at spaced or separated wales as indicated at 4, in Fig. 2, and in spaced or separated courses as therein shown and as indicated in dotted lines in Fig. 1, the elastic thread being fed under light tension and locked preferably in vertically aligned wales in the spaced courses, and floated between said spaced wales on the inner face of the fabric. This results in drawing in the plain knit seamless top into a plurality of vertical corrugations giving it the appearance and form fitting effect of ordinary rib knitting while the floated portions provide a large number of horizontal and practically continuous beads or ridges capable of very slightly indenting the skin of the wearer and being so widely distributed over so large an area as to hold up the stocking leg and dispensing with the use of a garter, the tension of each individual coil of elastic thread being so slight as to be practically unnoticed by the wearer.

5 represents the leg of the stocking formed of rib knitting, and as shown in the drawing, what is known as 6 x 3 rib, but any other type of rib knitting may be employed. The rib knitting extends over the top of the foot ordinarily as indicated at 6, but terminates before reaching the heel and toe, and the sole 7, heel 8 and toe 9, are formed in the usual or any preferred manner. In the preferred form of our invention, as before stated, the first row of stitches of the rib knit leg 5 are knit directly into and necessarily comprise the same number of stitches as in the last course of the plain knit top 1, the leg being knit in some instances with the same identical body thread or threads that are used in the plain knit top, although this is not essential.

In carrying out our invention and producing this novel sock, we prefer to knit the entire sock on a single machine as hereinafter described, capable of producing both plain and rib knitting, but this also is not essential as the top 1 and leg 5 may be knitted on separate machines and transferred from one to the other, or the plain knit top and rib knit leg may be formed on separate machines and subsequently united by looping, sewing, or otherwise.

Where it is desired to form the plain knit elastic top and the rib knit leg of the same machine, we find it convenient to employ a rib knitting machine of the type in which two co-axial cylinders, one above the other, are employed in connection with a circular series of needles having the usual hook and latch at each end of each needle, the needle grooves of the co-axial cylinders being in vertical alignment so that all of the needles may be operated in conjunction with suitable cam mechanism in one cylinder, as the lower cylinder, for knitting plain knit fabric, while selected needles may be moved vertically into the grooves of the other cylinder while retaining the stitches thereon and caused to knit at their opposite ends in conjunction with the non-selected needles remaining in the lower cylinder for the production of rib knitting. Obviously, the design of the rib knitting as 6 x 3, 5 x 2, 1 x 1, etc., depends upon the selection of the needles to be transferred from the lower cylinder to the upper cylinder.

In the accompanying drawing, we have illustrated in Figures 3, 4, 5 and 8, so much of a machine of this character, for example, the well known Komet knitting machine, made by The Bentley Engineering Co. of Leicester, England, as is necessary for a complete understanding of our present invention.

In Figure 3 of the drawings, 10 represents the lower knitting cylinder provided with vertically movable sliders 11, located in the grooves thereof and having selecting nibs 12 and knitting nibs 13 for engaging suitable cams on the cam cylinder indicated at 14. Each of the sliders 11 is provided at its upper end with a terminal portion comprising a needle-engaging hook 15 and a latch engaging extension 16 for connecting the sliders with such needles as are present in the lower knitting cylinder. 20 represents the upper needle cylinder provided with a series of sliders 21 engaging the grooves thereof and having selecting nibs 22 and knitting nibs 23 for engaging the upper cam cylinder 24. The upper set of sliders are also provided at their lower ends with a terminal portion comprising the needle engaging hooks 25 and latch engaging extensions 26 for engaging the upper ends of the needles when they are transferred to the upper cylinder as hereinbefore described.

The needles indicated at 30 are provided, as shown, with the usual hook 31 and latch 32 at each end. When the needles are in the lower cylinder as shown in Figure 3, their lower hooks will engage the hooks 15 of the corresponding sliders 11 and the extensions 16 will engage the lower latches as indicated in the figure so that the needles will be operated by and with the sliders 11. Obviously, when all the needles 30 are in the lower cylinder the machine is adjusted for plain knitting.

Figure 4 is a diagrammatic plan view of the lower cylinder, the arrow indicating the direction of rotation. Thread may be supplied to the upper hooks of the needles in any desired manner and I have indicated the usual series of thread guides at 33 for feeding the fabric thread or threads, any desired number of these thread guides being provided. The cam cylinder 14 will be provided with the usual knitting cams adjacent to the thread guides 33, a portion of these cams being indicated at 17, 18, in Figure 5, and the location of the knitting wave being indicated diagrammatically by the bracket KW in Figure 4. At approximately 90° beyond the center of the knitting wave, the cam cylinder 14 is provided with supplemental knitting cams for acting upon the sliders of selected needles which are to receive the elastic thread thereby producing a supplementary knitting wave and the elastic thread is supplied to the needles by a supplementary thread guide 34, which is preferably mounted pivotally so that it can be swung into and out of operative relation with the lower needle cylinder as indicated diagrammatically in Figure 4.

In our preferred arrangement the elastic thread which may be pure rubber, or preferably the well known Lastex, is locked into the fabric in every fourth wale in the spaced courses in which it is incorporated. This spacing of the points at which the elastic thread is interlocked may be varied within wide limits from every other wale upward, but we have found that by locking it in every fourth wale, very desirable results are accomplished. The actual interlocking of the elastic thread into the fabric may be accomplished in any one of a number of ways, and we have shown in this application three different ways in which it may be so interlocked. According to one method, which is our preferred method, the selected needles are raised above the others to such an extent that the elastic thread may be fed thereto below the latches, while the body thread is fed to the hooks of all the needles with the result that the elastic thread is firmly held by the surrounding body thread at the wales produced by the selected needles and is floated on the back of the fabric between the selected needles.

According to another method, the elastic thread is fed together with and in plating relation with the fabric or body thread to the hooks of the selected needles, the remaining needles taking only the body thread with the result that the elastic thread is locked in the wales produced by the selected needles, and floated on the inner face of the fabric therebetween. In this case, while loops of the elastic thread are actually drawn by the selected needles, the light tension under which the elastic thread is fed causes it to straighten out in the fabric.

Still another method consists in feeding the elastic thread into the hooks of the selected needles and immediately drawing loops of the elastic thread and casting off the body thread loops held by those needles, and thereafter feeding the body thread to the hooks of all of the needles so that the selected needles will draw loops of body thread through the previously formed loops of the elastic thread. In this case, the tension of the elastic thread will cause it to straighten out, and in this case also the elastic thread will be floated on the back of the fabric between the wales in which it is locked.

The mechanism illustrated in the drawings is capable of carrying out all of these methods and we will first describe the method in which the elastic thread is fed to the selected needles below the latches thereof. Certain of the sliders 11 of the lower cylinder are provided with long selecting nibs 12, in this instance, every fourth slider, while the remaining sliders are provided with short nibs 12a, as will be readily understood. The cam block 14a of the cam ring 14 adjacent to the auxiliary thread guide 34 for the elastic thread is provided with a vertically movable selecting cam 35 for engaging only the long selecting nibs 12 when the cam 35 is in its raised position, indicated in dotted lines in Figure 5. Adjacent to the selecting cam 35 the cam block 14a is provided, in this instance, with a permanent draw-down cam 36, and a radially movable draw-down cam 37 for engaging the knitting nibs 13 of the sliders. The cam 37 is supported by a plunger 38 and is movable therewith into and out of operative position by the pattern mechanism of the machine. Forward of the permanent draw-down cam 36 there is a shunt cam 39 movable into and out of position by means of an arm 40 mounted on a pivot 41 in the cam block.

Assuming that all of the needles are in the lower cylinder and the machine is ready to knit plain knitting, to insert the elastic thread, the thread guide 34 is swung into operative position as shown in full lines in Figure 4. The selecting cam 35 is moved to its raised position, indicated in dotted lines in Figure 5, the shunt cam 39 is moved outward out of operative position, and the draw-down cam 37 is moved inward into operative position. As the cylinder rotates the sliders 11 having the long selecting nibs 12, that is to say in this instance, every fourth slider will be raised by the selecting cam 35, so as to carry their knitting nibs 13 above the stationary draw-down cam 36, while the knitting nibs of the remaining needles will be in position to engage the draw-down cam 36. The elastic thread indicated at 50 in Figures 6a, 6b, 6c, and 7, will be fed below the latches of the selected needles as indicated in Figure 6a, and the selected needles will then engage the draw-down cam 37 which will draw down the selected needles while the remaining needles will be drawn down by the fixed cam 36. The elastic thread is drawn from a suitable spool under light tension applied to it in any usual or preferred way. The movable draw-down cam 37, however, is of such length that the selected needles will not draw a stitch or cast off the stitch of body thread which is held thereon, and the needles are then carried around to the throat where all the needles are raised, those between the selected needles passing in front of the elastic thread 50 and all of the needles receiving the body thread 51 from one of the thread guides 33, as shown in Figure 6b. The knitting nibs of all of the needles are then engaged by the regular knitting cam in the usual manner, each needle drawing a loop of body thread 51 through a previously formed loop of body thread, as clearly shown in Figure 6c. In this figure, it will clearly appear that the loops drawn by the selected needles will pass around the elastic thread 50 and lock it into the fabric, while the loops drawn by the intermediate needles will be clear of the elastic thread, thus forming the float portion 50a between the embracing loops formed by the selected needles.

Figure 7 is a detail diagrammatic view of a portion of the fabric showing the rubber thread 50 locked into the fabric at separated wales, in this instance at every fourth wale, as at a and e in Figure 7, and floated as indicated at 50a behind intervening wales b, c and d. When a complete course containing a rubber thread 50 has been completed the auxiliary thread guide 34 is thrown out of operative position, as indicated in dotted lines at Figure 4, the movable drawdown cam 37 is withdrawn, the shunt cam 39 is moved inward into operative position adjacent to the fixed draw-down cam 36, and the selecting cam 35 is lowered out of engagement with the sliders having the long selecting nibs 12, so that the elastic yarn will not be fed. In making this and any other intervening courses, the knitting nibs 13 of all the sliders will after passing up the cam 18, engage the shunt cam 39 which raises them high enough to pass over the fixed draw-down cam 36, and they will also pass by the draw-down cam 37 which is at that time withdrawn from operative position. In knitting this course, therefore, and any other intervening courses between the rubber carrying courses, the needles will receive only the body thread or threads from one of the thread guides 33 in the usual manner for the production of plain knitting.

We prefer to space the courses containing the rubber or Lastex thread as indicated in Figures 1 and 2, and to knit three courses of plain knitting with the body thread between adjacent courses containing the elastic thread. After the three courses of plain knitting with the body thread only, the auxiliary thread guide 34 is again moved into operative position, the selecting cam 35 is raised to operative position with respect to the long selecting nib sliders, drawdown cam 37 is moved inward to operative position, and the shunt cam 39 is moved outward out of operative position, when the operation of feeding the elastic thread 50 to the selected needles and the body thread to all the needles, previously described, will be repeated, the elastic thread being floated from course to course in which it occurs, preferably under the control of a suitable take-up. It will be observed that in this manner the elastic thread will be continuous throughout the knitting of the top of the stocking and this is our preferred construction. We, however, desire it to be understood that by the use of the customary and well known clamp and cutter mechanism the elastic thread may be severed at the termination of each of the courses containing it and reintroduced in the next consecutive course in which it is incorporated. It is also to be understood that we do not limit ourselves to the separation of the courses containing the elastic thread by the interposition of three plain knit courses in which it does not appear, as the courses containing the elastic thread may be separated or spaced a greater or lesser number of courses apart. In some instances, where a very fine elastic thread is employed, it may be inserted in every course of plain knitting constituting the top of the sock or stocking, but we prefer to space the rubber bearing courses to a greater or lesser extent and preferably by three intervening courses not containing the elastic thread, as before stated.

After the desired number of plain knit courses have been knit to form the top 1, as indicated in Figures 1 and 2, the knitting cylinders are given a complete revolution during which certain selected needles are transferred to the upper cylinder and placed in operative relation with the upper sliders 21 thereof, the needles passing upwardly through the last loops of the plain knitting and holding the loops thereon. The mechanism for effecting the transfer of the selected needles to the upper cylinders in preparation for rib knitting is well known and forms no part of our present invention. If 6 x 3 rib knitting is to be carried out throughout the leg and top of the foot, as indicated in Figure 1, groups of three needles will be elevated into the upper cylinder while intervening groups of six needles will be retained in the lower cylinder.

Figure 8 represents a partial section of the cylinder with the portion of the needles in the upper cylinder and the remaining needles in the lower cylinder. In forming the leg of the stocking, it will be knit as a 6 x 3 rib fabric, the first course of the rib leg 5 being knit with the body thread 51 (or by a substituted body thread or threads, if preferred), supplied by one of the thread guides 33, the auxiliary thread guide 34 remaining out of operative position.

Any type of rib knitting may be produced during the knitting of the leg portion of the sock or stocking, depending upon the disposition of the selected needles which are transferred from the lower cylinder to the upper cylinder and placed in operative relation with the sliders 21 thereof, the said needles being operated by the knitting nibs 23 engaging suitable knitting cams in the upper cam ring 24. The foot of the stocking comprising the heel, the top of the foot (through which the rib knitting is usually continued), the sole and the toe are knit in the usual or any preferred manner, thus producing the sock or stocking illustrated in Figures 1 and 2.

It will be noted that there is thus produced a unitary sock or stocking having the top of plain knit fabric containing in certain courses thereof, and preferably in spaced courses thereof, an elastic thread locked into the fabric at spaced or separated wales thereof, and floated on the inside of the fabric between the wales in which it is so locked into the fabric, while the leg of the stocking comprises rib fabric, the first course of the rib knit fabric being knit into the last course of the plain knit top. It will also be noted that the elastic thread in each course in which it occurs extends entirely around the top without being deflected at the wales into which it is locked into the fabric, and being under light tension the plain knit fabric of the top 1 throughout its length is drawn into vertically disposed rib like ridges, as indicated in Figures 1 and 2. The wales at which the elastic thread is locked into the fabric are preferably in vertical alignment and corresponding in the several rubber bearing courses. The sock or stocking, therefore, presents substantially the usual appearance of a rib knit stocking, notwithstanding the fact that the top is of plain knitting. It will also be seen that when the stocking is drawn onto the foot and leg of the wearer the plain knit top will be distorted so that the vertical rib like ridges thereof will disappear and the floated portions of the rubber thread lying on the inner surface of the plain knit top will form substantially continuous horizontal ridges which will individually and very slightly bear upon and indent the skin of the wearer, and being distributed over such a large area, will firmly support the leg of the sock or stocking and prevent it from slipping downward, without any appreciable tension on the leg of the wearer and without the slightest discomfort. The fact that the circular series of rubber threads extend around the top of the stocking without material deflection reduces the amount of rubber thread required for the series of rubber bearing courses to a minimum, and also avoids any interference with the stretching of the individual coils of rubber thread due to their being locked at spaced wales into the fabric.

In some instances, it may be considered desirable to so feed the rubber or other elastic thread so that loops thereof may be drawn by the selected needles. In such case, it is only necessary to raise the auxiliary thread guide 34 in the construction previously described, sufficiently to cause it to feed the elastic thread 50 above the latches of the selected needles, as indicated in Figure 9a of the drawings, the operation of the machine being otherwise exactly the same as previously described. As the selected needles are drawn down by the movable draw-down cam 37, the rubber thread will pass to the rear of the intervening needles as previously described, and when the needles reach the throat all of the needles will receive the body thread 51, as indicated in Figure 9b, and passing through the knitting wave the selected needles will draw loops or stitches of both rubber thread and the body thread as clearly shown at 50b in Figure 9c, while the intervening needles will draw loops of the body thread only, the rubber thread being floated as at 50a behind these loops.

Figure 10 illustrates diagrammatically a portion of the plain knit fabric so formed as it would appear theoretically. However, the loops in which the elastic thread occurs, do not remain in loop form due to the slight tension under which the elastic thread is fed. Instead, the elastic thread 50 straightens out in the manner indicated in Figure 11, and slightly distorts the soft body thread loops adjacent thereto, so that actually the rubber bearing courses when incorporated in the fabric by actually drawing loops of the rubber thread together with the body thread produces substantially the same result as in the method previously described, in that the rubber thread extends without deflection throughout the entire course, the only difference being the particular manner in which the adjacent portions of the body thread surround and lock it into the fabric.

In Figures 12 to 19, we have illustrated still another method of locking the elastic thread into the plain knit fabric at spaced wales thereof, according to which the selected needles are caused to draw a loop of the elastic thread and positively cast off the loop of body thread previously held by these needles. The only change necessary to produce this effect is that the movable draw-down cam 37a (see Fig. 20), has its lower end slightly extended as indicated at 37b, so that it will draw down the selected needles far enough to form a loop in the rubber thread and cast off the loop of body thread previously held.

In forming a rubber bearing course during the knitting of the plain knit top according to this method, when a rubber bearing course is to be produced, the selecting cam 35 is raised to operative position, the shunt cam 39 is thrown out of operation, the draw-down cam 37a is moved inward into operative position, and the auxiliary thread guide 34 which feeds the elastic thread under light tension is moved to operative position. As the cylinder rotates, the selected needles will be raised by the selecting cam 35, as indicated in Figures 12 and 13, so as to carry the knitting nibs of their sliders above the stationary draw-down cam 36, the remaining needles being lowered by the draw-down cam 36, while the selected needles receive the elastic thread in their hooks, as indicated in Figure 13, and are drawn down by the cam 37a, taking the elastic thread downward (see Fig. 14) to form loops 50c which are drawn through the loops 51a of body thread previously held by the selected needles (see Figs. 15 and 16). The loops 51a of the body thread are, therefore, cast off by the selected needles and when the needles arrive at the throat all of the needles receive the body thread 51 and draw loops thereof through the loops previously held on the needles, with the result that the selected needles draw the loops 51a through the previously formed loops 50c of the elastic thread while the intervening needles merely draw loops of the body thread through previously held loops of body thread, as clearly shown in Figure 18. This leaves all the needles holding a stitch or loop of body thread through all of which the loops of body thread constituting the next intervening non-rubber bearing course are knit by all the needles as previously described. In forming the rubber bearing courses in this manner, the elastic thread will likewise due to the tension under which it is fed, straighten out as indicated in Figure 19, distorting the adjacent loops of body thread which lock it into the fabric so that when the elastic thread is incorporated in this manner the result is substantially the same as that previously described insofar as the rubber or elastic threads are concerned. The only difference is the manner in which the portions of the body thread which surround the elastic thread at spaced wales are arranged in the fabric. As will be seen from Figure 19, the Lastex threads 50 are locked in spaced wales in spaced courses and floated in each course as at 50a between the wales at which it is locked in the fabric and on the inner face of the fabric.

In describing our improved stocking and the process of knitting it, we have described both the plain knit elastic top and the rib knit leg of the stocking as being seamless, that is to say, knit on a circular series of needles. We wish it to be understood, however, that our process may be carried out either as to the plain knit top of the stocking, or the rib knit leg of the stocking, or both, on a full-fashioned knitting machine and either or both parts of the stocking made as flat fabric, the vertical edges being united in a well known way at the back of the stocking. For this purpose the Karl Lieberknecht full-fashioned rib machine, manufactured by Karl Lieberknecht, Oberlungwitz, Saxony, Germany, for example, can be used for the purpose. We, therefore, desire it to be understood that in carrying out our invention we may make the sock or stocking with seamless top and full-fashioned leg, or full-fashioned top and seamless leg, or full-fashioned top and leg. Obviously, where one part of the stocking is made full-fashioned and the other part is made seamless, they would be knitted separately and united by sewing or looping.

It is to be further understood that in carrying out our invention as hereinbefore described on a seamless knitting machine of the type referred to, as the Komet machine, for example, the knitting of the elastic top and the leg may be accomplished by plural feeding of the body threads, if desired, and if the machine is equipped for knitting a plurality of courses simultaneously, which is the case with certain of the Komet machines, for example. If plural feeding is employed, it is obvious that the elastic or rubber thread which is introduced at a separate feeding point may be introduced into any one of the plural courses simultaneously knitted and locked in any one of the previously described ways at separated wales in the courses into which it is incorporated.

What we claim and desire to secure by Letters Patent is:

1. An article of hosiery having a leg portion of knitted rib fabric and a self-supporting seamless tubular top formed of plain knit fabric the courses of which contain the same number of stitches as the courses of said rib fabric, corresponding wales of the adjacent courses of said fabrics being united.

2. An article of hosiery having a leg portion of knitted rib fabric and a self-supporting seamless tubular top formed of plain knit fabric the courses of which contain the same number of stitches as the courses of said rib fabric, each loop of the terminal course of stitches of said plain knit fabric being interlooped with a corresponding loop of the adjoining course of rib knit fabric.

3. An article of hosiery having a leg portion of knitted rib fabric and a self-supporting seamless top formed of plain knit fabric the courses of which contain the same number of stitches as the courses of said rib fabric, the body thread of the plain knit fabric extending continuously from one fabric to the other and uniting them integrally.

4. An article of hosiery comprising a self-supporting seamless top formed of plain knit fabric having elastic thread incorporated in selected courses, and locked into the fabric at selected wales of said selected courses, and having a rib knit leg portion united to said top the courses of said rib knit leg containing the same number of stitches as the courses of said plain knit fabric.

5. An article of hosiery comprising a self-supporting seamless top formed of plain knit fabric, having elastic thread incorporated in spaced courses and locked into the fabric at spaced wales of said spaced courses, and having a seamless leg portion of 6 x 3 rib knit fabric united to said top the courses of said rib knit fabric containing the same number of stitches as the courses of said plain knit fabric.

6. An article of hosiery comprising a self-supporting top formed of plain knit fabric, having elastic thread incorporated in spaced courses and locked into the fabric at spaced wales of said spaced courses, and having a seamless leg portion of 6 x 3 rib knit fabric knit continuously on to the terminal course of said plain knit fabric and integral therewith the courses of said rib knit fabric containing the same number of stitches as the courses of said plain knit fabric 7. An article of hosiery comprising a self-supporting seamless tubular top formed of plain knit fabric, and having a 6 x 3 rib knit seamless tubular leg united thereto, each course of the rib knit leg containing the same number of stitches as the courses of said plain knit fabric.

8. A sock comprising a self-supporting top formed of a single thickness of plain knit seamless fabric having an elastic thread incorporated under tension in spaced courses, and united to the fabric at corresponding vertically aligned spaced points in each of said spaced courses, and floated on the inner face of the top between said spaced points, and a leg of rib knit fabric having on its inner face recurrent groups of consecutive rib wales.

9. A sock comprising a self-supporting top formed of plain knit seamless fabric having an elastic thread incorporated in spaced courses, and united to the fabric at corresponding vertically aligned spaced points in each of said spaced courses, and floated on the inner face of the top between said spaced points, and a leg of rib knit fabric having on its inner face recurrent groups of consecutive rib wales, each course of the said rib knit fabric containing the same number of stitches as the said plain knit fabric, the uppermost course of the rib leg being integrally interknit with the lowermost course of the plain knit top.

10. A sock comprising a self-supporting top formed of plain knit seamless fabric having an elastic thread incorporated in spaced courses, and united to the fabric at corresponding vertically aligned spaced points in each of said spaced courses, and floated on the inner face of the top between said spaced points, and a leg of rib knit fabric having on its inner face recurrent groups of consecutive rib wales, the rib knit courses of the leg being composed of the same number of stitches as the plain knit courses of the top, and the thread forming the lowermost course of the plain knit top being continuous with the thread forming the uppermost course of the rib leg.

11. A stocking having a ribbed fabric instep and leg and a plain fabric top with a weft elastic thread contracting said top into rib-like fabric substantially continuing the ribbed fabric of the leg.

12. A stocking having a rib fabric instep and leg, and a plain fabric top with a weft elastic thread contracting said top into rib-like fabric, the courses of the rib fabric and plain fabric having the same number of stitches, and the stitches of the lowermost course of the plain fabric top being united stitch for stitch with the stitches of the uppermost course of the rib fabric leg.

13. A stocking having a rib fabric instep and leg and a plain fabric top with a weft elastic thread contracting said top into rib-like fabric, the courses of said plain fabric top having the same number of stitches as the courses of rib fabric leg, and the fabric of the leg being knit integrally with the fabric of the top.

14. A self-supporting article of hosiery having a rib knit leg portion and a plain knit top portion, the said top portion having elastic yarn incorporated throughout and secured in spaced wales whereby the elastic yarn contracts the plain knit fabric of the top into walewise extending ribs simulating rib knit fabric.

15. A self-supporting article of hosiery comprising a plain knit top portion having elastic thread extending coursewise in spaced courses and contracting the top into rib-like fabric and a rib knit leg portion knit integrally with said top.

JOHN H. MILLER.
FRANK EVANS.